United States Patent
Bechara et al.

[11] 3,892,687
[45] July 1, 1975

[54] QUATERNARY HYDROXYALKYL TERTIARY AMINE BASES AS POLYURETHANE CATALYSTS

[75] Inventors: Ibrahim Selim Bechara, Boothwyn; Felix Patrick Carroll, Chester; Rocco Lawrence Mascioli, Media, all of Pa.

[73] Assignee: Air Products and Chemicals, Inc., Allentown, Pa.

[22] Filed: July 9, 1973

[21] Appl. No.: 377,447

[52] U.S. Cl.... 260/2.5 AC; 260/2.5 AW; 260/75 NC; 260/77.5 AC; 260/77.5 NC; 252/426
[51] Int. Cl... C08g 22/36; C08g 22/44; C08g 33/04
[58] Field of Search... 260/2.5 AW, 2.5 AC, 77.5 NC, 260/77.5 AC, 75 NC; 252/426

[56] References Cited
UNITED STATES PATENTS

| | | | |
|---|---|---|---|
| 3,010,963 | 11/1971 | Erner | 260/2.5 AC |
| 3,168,483 | 2/1965 | Beitchman | 260/2.5 AW |
| 3,179,628 | 4/1965 | Beitchman | 260/2.5 AC |
| 3,294,753 | 12/1966 | Beitchman | 260/2.5 AW |
| 3,620,987 | 11/1971 | McLaughlin | 260/2.5 AC |
| 3,726,816 | 4/1973 | Fabris | 260/2.5 AC |
| 3,746,709 | 7/1973 | Patton | 260/2.5 AC |
| 3,766,103 | 10/1973 | Patton | 260/2.5 AW |

*Primary Examiner*—Melvyn I. Marquis
*Assistant Examiner*—C. Warren Ivy
*Attorney, Agent, or Firm*—Richard A. Dannels, Jr.; Barry Moyerman

[57] ABSTRACT

Catalysts having the following formula have been found to have unexpectedly high activity for the production of polyurethane resins:

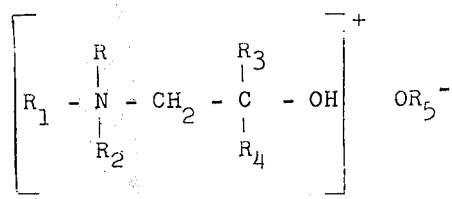

where:
R, $R_1$ and $R_2$ are independently selected from the group consisting of alkyls and hydroxyalkyls having 1 to 4 carbon atoms, aryls and aralkyls having 6 to 10 carbon atoms, and cycloalkyls and substituted cycloalkyls having 3 to 10 carbon atoms, $R_3$ and $R_4$ are independently selected from the group consisting of H, alkyls having 1 to 12 carbon atoms and aryls and aralkyls having 6 to 18 carbon atoms, and $R_5$ is selected from the group consisting of H, an alkyl having 1 to 2 carbon atoms and an aryl and an aralkyl having 6 to 10 carbon atoms.

14 Claims, No Drawings

QUATERNARY HYDROXYALKYL TERTIARY AMINE BASES AS POLYURETHANE CATALYSTS

BACKGROUND OF THE INVENTION

1. Field of the Invention

This invention relates to cellular polyurethane compositions and more particularly to a catalyst composition for use in promoting the formation of polyurethane foams.

2. Prior Art

The reaction of an isocyanato group with hydroxy groups can proceed at a significant rate because of the temperature of the reaction medium, but can be accelerated by the presence of an appropriate catalyst. Similarly, the reaction between the isocyanato group and water for the generation of a carbon dioxide blowing agent can be accelerated by a suitable catalyst. The dimerization of trimerization of isocyanates can also be accelerated by the proper catalyst.

The order of activity of numerous catalyst have been studied in simple systems, but such data has proven to be of little value in predicting the degree of suitability of a specific composition as a catalyst for the transformation of a precursor into a polyurethane foam under industrial conditions. Amine catalysts have been highly advantageous for promoting polyurethane polymerization; see Polyurethanes: Chemistry and Technology, Vol. I, Saunders and Frisch, Interscience Publishers, N.Y. (1962), at pages 138–139, 161–163 and 173–180. Quaternary ammonium compounds, which under the conditions of a prepolymerization reaction of a two-step process produce foamed polyurethane resins, decompose to liberate tertiary amines, as disclosed in Reis, U.S. Pat. No. 2,779,689 and Parker, U.S. Pat No. 2,981,700. Examples of the quaternary ammonium compounds which are disclosed for this purpose are the essential neutral salts formed by the reaction of a tertiary amine such as N-methyl morpholine with the anhydride of a dicarboxylic acid such as acetic acid. Such quaternary salts have less catalytic activity than the tertiary amines from which they are derived. Erner, U.S. Pat. No. 3,010,963 discloses the use of polyurethane foam catalysts of such quaternary hydroxyalkyl tertiary heterocyclic amine bases as N-$\beta$-hydroxyalkyl-diazabicyclooctane hydroxide having the following formula:

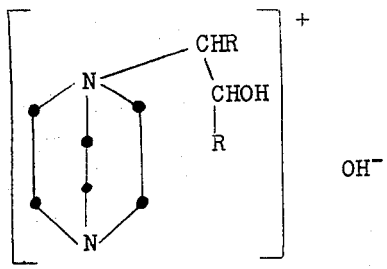

where:

R is hydrogen or an alkyl group having 1 to 10 carbon atoms.

The preparation of one specific example of a quaternary hydroxyalkyl tertiary amine base, e.g. dimethyl-bis[$\beta$-oxy-ethyl]-ammonium hydroxide, also written as N,N-dimethyl-N,N-dihydroxyethyl ammonium hydroxide, is disclosed in Beilstein, Organische Chemie, Vol. IV (1922), at page 284. A process for producing such quaternary ammonium bases is disclosed in Ulrich et al, U.S. Pat. No. 2,173,069. Such products have been disclosed as being useful as additives in the printing of fabrics and in the preparation of artificial fibers, as well as in the preparation of dyestuff pastes and powders.

SUMMARY OF THE INVENTION

In all of the foregoing prior art references, the reactions to produce the quaternary ammonium compounds are carried out in the presence of an excess amount of water. These reactions are in contrast to the synthesis reaction to produce the quaternary catalyst of the present invention which is carried out either in the presence of a stoichiometric amount of water in case of the quaternary ammonium hydroxides or in the absence of water in the case of the quaternary alkoxides and phenoxides.

In accordance with the present invention, in a method for the preparation of cellular polyurethane resins, a catalyst is provided comprising a quaternary hydroxyalkyl tertiary amine base having the formula

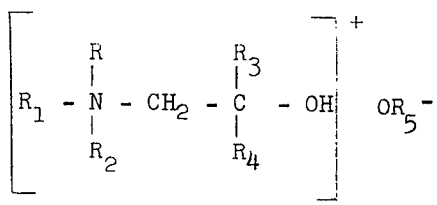

where:

R, $R_1$ and $R_2$ are independently selected from the group consisting of alkyls and hydroxyalkyls having 1 to 4 carbon atoms, aryls and aralkyls having 6 to 10 carbon atoms, and cycloalkyls and substituted cycloalkyls having 3 to 10 carbon atoms, $R_3$ and $R_4$ independently selected from the group consisting of H, alkyls having 1 to 12 carbon atoms and aryls and aralkyls having 6 to 18 carbon atoms, and $R_5$ is selected from the group consisting of H, a alkyl having 1 to 2 carbon atoms and an aryls and an aralkyl having 6 to 10 carbon atoms.

This catalyst is particularly useful in the process for making polyurethane and polyurethane-polyisocyanurate foams in which the catalyst is combined with a precursor comprising a polyol, a polyisocyanate, a blowing agent and a foam stabilizer in a suitable mixing device to produce the foamed plastic by techniques well known in the art. Compositions of the present invention may also be used as polymerization catalysts for epoxides and in the preparation of polyols from diols or triols and alkylene oxide. They may also be used as the catalysts in the preparation of phenolic resins and in other applications where basic catalysis is required.

The polyol contains at least two alkanol groups per molecule. Suitable examples include polyethylene glycol, polypropylene glycol, a linear polyester such as glycolterphthalate, glysolsuccinate, tetramethyleneglycol adipate or other hydroxy terminated linear ester. Also the polyol may be glycerol, a polyethylene ether derivative of glycerol, erythritol, pentaerythritol, mannitol, sorbitol, $\alpha$methyl glycoside and sucrose. The polyol may be a poly(oxyalkylene)polyol derived from a polyamine such as ethylenediamine or a polyalkylene oxide derivative of a starch. Mixtures of the polyols are satisfactory.

The polyisocyanate contains at least two isocyanate groups per molecule such as a tolylene diisocyanate (TDI). It is generally advantageous to employ an undistilled mixture of a technical grade TDI. Any of the other conventionally employed polyisocyanates such as diisocyanatodiphenylmethane, condensation products providing a plurality of phenyl groups and a plurality of isocyanato groups, hexamethylenediisocyanate, chlorophenyldiisocyanate, bromophenyldiisocyanate, tetraisocyanatodiphenylmethane, and the like may be used.

The blowing agent may be water and/or a volatilizable organic agent such as dichlorodifluoromethane-Freon 12; dichlorofluoromethane; trichloromonofluoromethane; 1,1-dichloro-1-fluoroethane; 1-chloro-1,1-difluoro-2,2-dichloroethane; 1,1,1-trifluorobutane; 2-chloro-2-fluorobutane; 3,3-difluorobutane; 4,4,4-trifluorobutane; 1,1-difluoroethane; $C_4F_8$ cyclic-Freon C-318; dichlorotetrafluoroethane-Freon 114; trichlorotrifluoroethane-Freon 113; methylene chloride; carbon tetrachloride; butanes; pentanes; heptanes; and the like. Any suitable blowing agent may be employed in the precursor of the present invention.

The foam stabilizer or surfactant which is preferably included in the precursor may be any compound effective in favoring the retention of the gas generated during the polymerization reaction, whereby relatively small cell size is attained as distinguished from the evolution of the very large cells. The foam stabilizer may be of the silicone type, such as silicone block polymers comprising polyalkyleneglycol units. Another effective cell stabilizer composition is the free radical initiated polymerization product of N-vinyl pyrrolidone or N-vinyl pyrrolidone and dibutyl maleate or N-vinyl pyrrolidone, dibutyl maleate and vinyl acetate in a medium of a polyfunctional polyether polyol as disclosed in application Ser. No. 180,183, filed Sept. 13, 1971, now U.S. Pat. No. 3,746,663, issued July 17, 1973, which disclosure is incorporated herein by reference.

The process for preparing the quaternary hydroxyalkyl tertiary amine bases of the present invention are prepared, in general, by reacting stoichiometric amounts of either water or a carbinol, a tertiary amine and an alkylene oxide at controlled temperatures in the range of 0° to about 100°C, preferably 10° to 40°C.

The tertiary amines, which are preferably employed in an excess amount to prepare the catalyst of this invention, have the formula

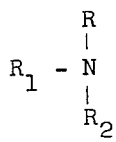

where:
R, $R_1$ and $R_2$ are as defined above.
Specific examples of the tertiary amines include triethanolamine, methyldiethanolamine, ethyldiethanolamine, dimethylethanolamine, butyldiethanolamine, octadecyldiethanolamine, cyclohexyldiethanolamine, benzyldiethanolamine, benzylmethylethanolamine, diethylethanolamine, diethylcyclohexynol, methyloctadecylethanolamine and methyloctadecenylethanolamine.

The alkylene oxides have the formula

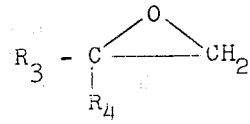

where:
$R_3$ and $R_4$ are defined as above.
Examples of such alkylene oxides which are particularly suitable in the catalyst of this invention include propylene oxide, ethylene oxide, 1,2-butylene oxide, 1,2-pentene oxide, styrene oxide, the dioxides of dienes, e.g. butadiene epoxide and mixtures thereof.

The carbinols are selected from those having the formula $$R_5OH$$

where:
$R_5$ is defined as above.
Examples include methanol, ethanol, isopropanol, butanol, phenol and substituted phenols, e.g. bis-phenol A (p,p'-dihydroxydiphenyldimethylmethane), to form the methoxide, ethoxide, propoxide, butoxide and phenoxide homologs of the quaternary ammonium hydroxide catalyst of the present invention.

The reaction to produce the quaternary hydroxyalkyl tertiary amine base catalysts of the present invention can be represented by the following equation:

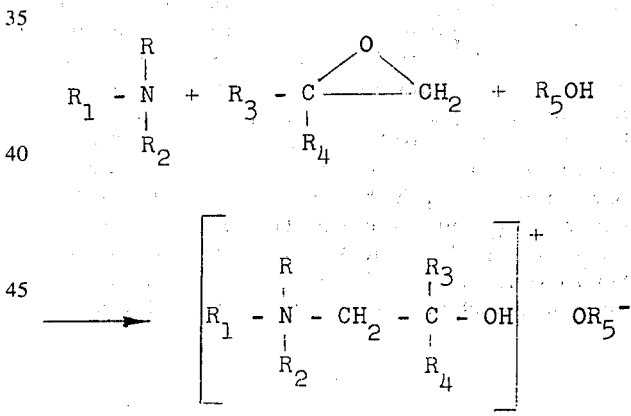

The catalyst composition of this invention, which is preferably derived from a reaction employing an excess amount of the tertiary amine, contains in the range from about 30 to 50 mole percent of this tertiary amine. If a stoichiometric amount of the tertiary amine were employed in the reaction, the quaternary catalyst would dissociate to an equilibrium amount of the tertiary amine within this same range. Because the molecular weight of the quaternary hydroxyalkyl tertiary amine catalyst is much larger than that of the tertiary amine, the weight percent of the tertiary amine based on the weight of total catalyst composition is less than 50 and usually is in the range of about 10 to 40 percent by weight. Therefore, the dilutive effect the less active tertiary amines have on the total composition is insignificant especially when one considers the impracticality of isolating the quaternary catalyst of this invention free of the amine.

The concentration of this quaternary catalyst composition in the precursor is usually in the range of 0.5 to 2 parts by weight per 100 parts by weight of polyol and is preferably in the range of 0.8 part to 1.5 parts per 100 parts of polyol. The final selection of the catalyst concentration is left up to the operator of the plant and it depends on many factors including the type of precursor, the conditions employed, the specific catalyst and whether a cocatalyst is employed.

The examples below illustrate the methods of preparation of the catalysts of the present invention and their use in polymerization.

EXAMPLE 1

This Example illustrates the preparation of the quaternary hydroxyalkyl ammonium hydroxide catalysts of this invention. In a four-neck resin vessel equipped with a stirrer, a thermometer, a reflux condenser and an addition funnel were placed two moles of one of the tertiary amines set forth in Table I below and 1 mole of water. The mixture was stirred and the heat of hydration was liberated to cause the temperature of the reaction to increase to about 30°. At this point, 1 mole of the corresponding alkylene oxide of Table I was slowly added to the vessel. The alkylene oxide addition was controlled so that the reaction temperature remained between about 30° to 40°C. After the addition of the alkylene oxide was completed, the reaction mixture was maintained within the foregoing temperature range for a period of about 2 hours. The reaction mixture was analyzed for the content of the quaternary amines and the tertiary amines by nuclear magnetic resonance (NMR) and by titrimetric analysis. Table I below indicates the compounds produced and their titrimetric analyses. As a result of the use of one mole of the tertiary amine in excess of the stoichiometric amount required, all of the products listed in Table I below also contained 50 mole percent of the respective tertiary amine used in the reaction. The NMR spectra for each of these products of Table I showed two distinct signals, one signal was at 2.25 ppm for the tertiary N-methyl protons and the other signal was at 3.20 ppm for the quaternary N-methyl protons.

TABLE I

QUATERNARY HYDROXYALKYL AMMONIUM HYDROXIDE CATALYSTS

| Run. No. | Reactants | | Product | Titrimetric Analysis | |
|---|---|---|---|---|---|
| | Tertiary Amine | Alkylene Oxide | | Meq/g Quat. | Meq/g Tert. |
| 1 | DMEA* | Propylene Oxide | N,N-dimethyl-N-hydroxyethyl-N,2-hydroxypropyl ammonium hydroxide | 2.86 | 4.93 |
| 2 | DMEA | Styrene Oxide | N,N-dimethyl-N-hydroxyethyl-N,2-phenylhydroxyethyl ammonium hydroxide | 2.23 | 4.67 |
| 3 | DMEA | Nedox® 1114** | N,N-dimethyl-N-hydroxyethyl-N,2-hydroxyalkyl*** ammonium hydroxide | 1.54 | 3.40 |
| 4 | DMEA | 1,2-Butylene Oxide | N,N-dimethyl-N-hydroxyethyl-N,2-hydroxybutyl ammonium hydroxide | 1.45 | 2.21 |
| 5 | Dimethyl-benzylamine | Propylene Oxide | N,N-dimethyl-N-hydroxybenzyl-N,2-hydroxypropyl ammonium hydroxide | 0.85 | 1.88 |

*Dimethylethanolamine

**A lauryl-myristyl range olefin oxide having an average molecular weight of 189 and having as its principal constituent the oxidation product of terminal straight chain mono-olefins which is represented by the formula:

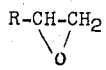

where
    R is a $C_9$ - $C_{12}$ straight chain alkyl radical.
The olefin oxide is manufactured by Archer Daniels Midland Co. The molecular weight distribution of the olefin oxide as measured by gas chromatograph is:

| Total Carbon Chain Length | % |
|---|---|
| $C_{11}$ | 28.2 |
| $C_{12}$ | 28.2 |
| $C_{13}$ | 26.2 |
| $C_{14}$ | 17.4 |
| | 100.0 |

***Where the alkyl ranges from 9 to 12 carbon atoms.

EXAMPLE 2

This Example illustrate the preparation of the quaternary hydroxyalkyl ammonium alkoxide or phenoxide catalysts of this invention. In a round bottomed flask equipped with a stirrer, a thermometer, a reflux condenser and an addition funnel were placed one mole of dimethylethanolamine and ½ mole of either of the carbinols set forth in Table II below. The mixture was agitated during the addition of ½ mole of propylene oxide at a rate so that the reaction temperature did not exceed 50°C. After the addition of the propylene oxide was completed, the mixture was stirred for an additional 2 hours before it was analyzed in a manner similar to that of Example 1. Table II below shows the compounds produced and their titrimetric analysis. Each of the products of Table II contained 50 mole percent unreacted DMEA. The NMR spectra of the Table II products showed two resonance signals for the two different methyl groups; one was at 2.2 ppm for the tertiary N-methyl protons and the other was at 3.3 ppm for the quaternary N-methyl protons.

TABLE II

QUATERNARY HYDROXYALKYL AMMONIUM METHOXIDE OR PHENOXIDE

| Run No. | Reactants | | | Product | Titrimetric Analysis | |
|---|---|---|---|---|---|---|
| | Tertiary Amine | Carbinol | Alkylene Oxide | | Meg/g Quat. | Meg/q Tert. |
| 6 | DMEA | Methanol | Propylene Oxide | N,N-dimethyl-N-hydroxyethyl-N,2-hydroxypropyl ammonium methoxide | 2.52 | 4.95 |
| 7 | DMEA | Phenol | Propylene Oxide | N,N-dimethyl-N-hydroxyethyl-N,2-hydroxypropyl ammonium phenoxide | 2.81 | 3.30 |

EXAMPLES 3-7

These Examples illustrate the formation of isocyanurates from selected catalysts produced in Examples 1 and 2. In 8 ounce glass jars were mixed 15 parts of toluene, 5 parts of phenyl isocyanate and 1 part of one of the catalysts of Tables I or II. The reactants were thoroughly mixed and allowed to stand at room temperature for two days. The solid precipitate that was formed during this period was filtered off and washed with a small portion of a solvent comprising 50 volume percent acetone and 50 volume percent toluene. The washed precipitate was then dried in a vacuum oven at 60°C for 1 hour. Table III below indicates the catalysts used, the melting point of the resulting triphenyl isocyanurate product and the percent yield of the product based on the theoretical that was obtained.

CONTROL 1

The control shown in Table III below is to be used as a basis for comparing the isocyanurate products obtained from the catalysts of this invention with the product obtained from a commercially available polyurethane catalyst. The same procedure was followed in this control run that was used in Examples 3-7.

TABLE III

ISOCYANURATE PRODUCTION

| | Catalyst | Isocyanurate Product | |
|---|---|---|---|
| | | M.P.,°C | % Yield |
| Control | DMP-30* | 287-288 | 48 |
| Ex. 3 | N,N-dimethyl-N-hydroxyethyl-N,2-hydroxypropyl ammonium hydroxide in 50 mole % DMEA | 284-285 | 40 |
| Ex. 4 | N,N-dimethyl-N-hydroxyethyl-N,2-hydroxypropyl ammonium hydroxide in 50 mole % DMEA** | 282-284 | 72 |
| Ex. 5 | N,N-dimethyl-N-hydroxyethyl-N,2-phenylhydroxyethyl ammonium hydroxide in 50 mole % DMEA | 282-284 | 48 |
| Ex. 6 | N,N-dimethyl-N-hydroxyethyl-N,2-hydroxyalkyl*** ammonium hydroxide in 50 mole % DMEA | 283-284 | 68 |
| Ex. 7 | N,N-dimethyl-N-hydroxyethyl-N,2-hydroxypropyl ammonium methoxide in 50 mole % DMEA | 287-288 | 64 |

*2,4,6-tri(dimethylaminomethyl)phenol manufactured by Rohm and Haas Co.
**The catalyst also included 10% by weight of DABRO triethylenediamine, manufactured by Air Products and Chemicals, Inc.
***Where the alkyl ranges from 9 to 12 carbon atoms.

The foregoing melting points of the products obtained for the control catalyst and the catalysts of this invention are comparable with the melting point of 282°-284.9°C for the triphenylisocyanurate product obtained as reported in the literature: B. D. Beitchman, *Industrial and Engineering Chemistry Product Research and Development*, Vol. V, at pages 35-41 (1966).

EXAMPLE 8

Using the same procedure as indicated in Examples 3-7, an eight ounce jar was charged with 5 parts of phenylisocyanate, 15 parts of toluene and 0.4 parts of the Run No. 7 catalyst, e.g. 50 mole percent N,N-dimethyl-N-hydroxyethyl-N,2-hydropropyl ammonium phenoxide and 50 mole percent DMEA. The reactants were stirred resulting in an immediate precipitation with considerable exothermic heat release. The precipitate was filtered off, washed with toluene and dried in a vacuum oven at 50°C for 1 hour. The melting point of the resulting triphenylisocyanurate product was 284°-285°C. The infrared spectra showed the characteristic isocyanurate bands at 5.8 and 7.06μ.

EXAMPLES 9-13

Rigid polyurethane foams were prepared using various catalysts of the present invention. Each sample of foam was prepared using a precursor containing:

|  | Amount |  |
|---|---|---|
| Selectrofoam 6406[1] | 109 | grams |
| Silicone surfactant DC-193[2] | 1.5 | grams |
| Trichloromonofluoromethane | 47 | grams |
| Hylene TIC[3] | 105 | grams |

[1]Selectrofoam 6406 is a mixture of a polypropylene oxide propanol derivative of sucrose and an alkylene oxide derivative of ethylenediamine having a molecular weight of about 800 (see U.S. Pat. No. 3,153,002) and is manufactured by Pittsburgh Plate Glass Co.
[2]DC-193 surfactants comprise polysiloxane polyoxyalkylene block copolymers such as those described in U.S. Pat. Nos. 2,834,748 and 2,917,480 and is manufactured by Dow-Corning Co.
[3]Hylene TIC is a technical grade of tolylene diisocyanate (TDI) and is manufactured by E. I. du Pont DeNemours and Co. Hylene TIC is an undistilled toluene diisocyanate material which is a dark, brownish liquid typically having an NCO content of 38.75 to 39.75%, an amine equivalent of 105.5 to 108 and a viscosity at 25°C of 15 to 75 cps.

The precursor and selected catalysts were subjected to a standard hand mixed procedure for the "one-shot" preparation of a rigid foam. Measurements were taken during the procedure of the cream time, gel time, rise time and tack-free time. Tables IV and V below indicate the amount of catalyst compositions used in each of the runs and the resulting times achieved in the production of the rigid foams. The catalyst compositions for all of the examples of Tables IV and V except that of Example 9 contained a 50:50 mole ratio of the respective quaternary compound to DMEA or in the range of about 67 to about 77 percent by weight of the respective quaternary. The catalyst composition of Example 9 contained a 60:40 mole ratio of the quaternary to DMEA or 73.5 percent by weight of the quaternary.

CONTROLS 2–3

The controls indicated in Table V below are to be used as a basis for comparison between the polymerization results obtained by means of the catalysts of this invention and those of two commercial standard catalysts. The same precursor and foam preparation procedures were followed in the control runs at those in Examples 9–13.

TABLE IV

QUATERNARY HYDROXYALKYL AMMONIUM HYDROXIDE POLYURETHANE CATALYSTS

| Example | Catalyst | Meq/g Quat. | Meq/g Tert. | Amount php* | Results, seconds | | | |
|---|---|---|---|---|---|---|---|---|
| | | | | | Cream Time | Gel Time | Rise Time | Tack-free Time |
| 9A | N,N-dimethyl-N-hydroxyethyl-N,2-hydroxyethyl-N,2-hydroxypropyl ammonium hydroxide | 2.37 | 5.99 | 0.8 | 15 | 55 | 122 | 135 |
| | Duplicate sample | | | 0.8 | 15 | 57 | 120 | 134 |
| 9B | N,N-dimethyl-N-hydroxyethyl-N,2-hydroxypropyl ammonium hydroxide | 2.37 | 5.99 | 1.0 | 13 | 45 | 90 | 85 |
| | Duplicate sample | | | 1.0 | 13 | 46 | 90 | 85 |
| 10A | N,N-dimethyl-N-hydroxyethyl-N,2-phenylhydroxyethyl ammonium hydroxide | 2.23 | 4.67 | 0.8 | 23 | 68 | 270 | 240 |
| | Duplicate sample | | | 0.8 | 24 | 69 | 273 | 245 |
| 10B | N,N-dimethyl-N-hydroxyethyl-N,2-phenylhydroxyethyl ammonium hydroxide | 2.23 | 4.67 | 1.0 | 12 | 43 | 100 | 120 |
| | Duplicate sample | | | 1.0 | 13 | 45 | 107 | 120 |
| 11A | N,N-dimethyl-N-hydroxyethyl-N,2-hydroxyalkyl** ammonium hydroxide | 1.54 | 3.40 | 0.8 | 20 | 59 | 260 | 240 |
| | Duplicate sample | | | 0.8 | 20 | 60 | 265 | 240 |
| 11B | N,N-dimethyl-N-hydroxyethyl-N,2-hydroxyalkyl** ammonium hydroxide | 1.54 | 3.40 | 1.0 | 18 | 55 | 155 | 133 |
| | Duplicate sample | | | 1.0 | 16 | 56 | 153 | 130 |

*Parts of catalyst per hundred parts of polyol.
**Where alkyl group has 9 to 12 carbon atoms.

TABLE V

QUATERNARY HYDROXYALKYL AMMONIUM METHOXIDE OR PHENOXIDE POLYURETHANE CATALYSTS

| | Catalyst | Meq/g Quat. | Meq/g Tert. | Amount php | Results, seconds | | | |
|---|---|---|---|---|---|---|---|---|
| | | | | | Cream Time | Gel Time | Rise Time | Tack-free Time |
| Control 2A | Triethylene Diamine (DABCO R-8020) | — | — | 0.8 | 15 | 45 | 115 | 100 |
| Control 2B | Triethylene Diamine (DABCO R-8020) | — | — | 1.0 | 13 | 40 | 110 | 73 |
| Control 3A | DMEA | — | — | 0.8 | 20 | 58 | 195 | 170 |
| Control 3B | DMEA | — | — | 1.0 | 17 | 47 | 165 | 140 |
| Example 12A | N,N-dimethyl-N-hydroxyethyl-N,2-hydroxypropyl ammonium methoxide | 4.95 | 2.52 | 0.8 | 22 | 53 | 265 | 245 |
| Example 12B | N,N-dimethyl-N-hydroxyethyl-N,2-hydroxy-Propyl ammonium methoxide | 4.95 | 2.52 | 1.0 | 17 | 42 | 220 | 195 |
| Example 13A | N,N-dimethyl-N-hydroxyethyl-N,2-hydroxypropyl ammonium phenoxide | 3.30 | 2.81 | 0.8 | 15 | 37 | 170 | 150 |
| Example 13B | N,N-dimethyl-N-hydroxyethyl-N,2-hydroxypropyl ammonium phenoxide | — | — | 1.0 | 13 | 32 | 150 | 140 |

The results of Tables IV and V indicate that a criticality exists in the concentration that is required to result in a significant improvement in the activity of some of the quaternary catalysts of this invention over DMEA, the tertiary amine from which they were derived. At least 1 part by weight of either the Example 10 or the Example 11 catalyst per 100 parts by weight of polyol is the critical amount to achieve such an improvement.

In addition to the fact that the catalysts of this invention are highly active in the preparation of the polyurethane and polyurethane-polyisocyanurate foams, they are more readily compatible with certain of the polyols in commercial use today than the catalysts containing a heterocyclic moiety such as those described in Erner, U.S. Pat. No. 3,010,963.

Other well known polyurethane catalysts can be incorporated with the catalyst composition of this invention to produce a catalysts system which is tailored to polymerize specific precursors into the desired type of foam.

What is claimed is:

1. In the method of preparing cellular polyurethane plastic by the reaction of a precursor comprising a polyol having at least two alkanol groups per molecule, an organic polyisocyanate compound containing at least two isocyanate groups per molecule, a volatilizable blowing agent, and a catalyst, the improvement which comprises carrying out said reaction in the presence of a tertiary amine selected from the group consisting of triethanolamine, methyldiethanolamine, ethyldiethanolamine, dimethylethanolamine, butyldiethanolamine, octadecyldiethanolamine, cyclohexyldiethanolamine, benzyldiethanolamine, benzylmethylethanolamine, diethylethanolamine, diethylcyclohexynolamine, methyloctadecylethanolamine, methyloctadecenylethanolamine, and dimethylbenzylamine and a quaternary hydroxyalkyl tertiary amine base catalyst prepared by reacting stoichiometric amounts of water or a carbinol selected from the group consisting of methanol, ethanol, butanol, phenol and [bis-phenol A] p,p'-dihydroxydiphenyldimethylmethane and an alkylene oxide selected from the group consisting of propylene oxide, ethylene oxide, 1,2-butylene oxide, 1,2-pentene oxide, styrene oxide, butadiene epoxide, a lauryl-myristyl range olefin oxide having an average molecular weight of 189 and having its principal constituent the oxidation product of terminal straight chain mono-olefins which olefin is represented by the formula:

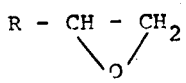

where R is a $C_9$–$C_{12}$ straight chain alkyl radical and mixtures thereof and an excess amount of said tertiary amine at controlled temperatures in the range of 0° to about 100°C.

2. The method of claim 1 wherein at least about 0.5 parts by weight of said catalyst is present in said precursor per 100 parts by weight of polyol.

3. The method of claim 1 in which the reaction mixture contains a surfactant.

4. The method of claim 1 in which the polyol contains at least three hydroxy groups per molecule and the plastic is a rigid foam.

5. The method of claim 1 in which the plastic is a highly resilient foam.

6. The method of claim 1 wherein said cellular polyurethane plastic comprises polyurethane-polyisocyanurate.

7. The method of claim 1 in which the quaternary hydroxyalkyl tertiary amine base is N,N-dimethyl-N-hydroxyethyl-N,2-hydroxypropyl ammonium hydroxide and the tertiary amine is dimethylethanolamine.

8. The method of claim 1 wherein said quaternary hydroxyalkyl tertiary amine base is N,N-dimethyl-N-hydroxyethyl-N,2-phenylhydroxyethyl ammonium hydroxide and the tertiary amine is dimethylethanolamine.

9. The method of claim 1 wherein said quaternary hydroxyalkyl tertiary amine is N,N-dimethyl-N-hydroxyethyl-N,2-hydroxyalkyl ammonium hydroxide having the following formula:

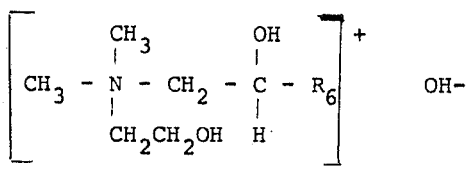

where:
$R_6$ is a $C_9$–$C_{10}$ straight chain alkyl radical and said tertiary amine is dimethylethanolamine.

10. The method of claim 1 wherein said quaternary hydroxyalkyl tertiary amine is N,N-dimethyl-N-hydroxyethyl-N,2-hydroxypropyl ammonium phenoxide and said tertiary amine is dimethylethanolamine.

11. A polyurethane catalyst composition for the polymerization of a polyol and an organic polyisocyanate which comprises a catalytic amount of a tertiary amine selected from the group consisting of triethanolamine, methyldiethanolamine, ethyldiethanolamine, dimethylethanolamine, butyldiethanolamine, octadecyldiethanolamine, cyclohexyldiethanolamine, benzyldiethanolamine, benzylmethylethanolamine, diethylethanolamine, diethylcyclohexynolamine, methyloctadecylethanolamine, methyloctadecenylethanolamine, and dimethylbenzylamine and a quaternary hydroxyalkyl tertiary amine base prepared by reacting stoichiometric amounts of wtaer or a carbinol selected from the group consisting of methanol, ethanol, butanol, phenol and [bis-phenol A] p,p'-dihydroxydiphenyldimethylmethane and an alkylene oxide selected from the group consisting of propylene oxide, ethylene oxide, 1,2-butylene oxide, 1,2-pentene oxide, styrene oxide, butadiene epoxide, a lauryl-myristyl range olefin oxide having an average molecular weight of 189 and having its principal constituent the oxidation product of terminal straight chain mono-olefins which olefin is represented by the formula:

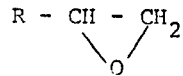

wherein R is a $C_9$–$C_{12}$ straight chain alkyl radical and mixtures thereof and an excess amount of said tertiary amine at controlled temperatures in the range of 0° to about 100°C.

12. The catalyst composition of claim 11 wherein in 30 to 50 mole percent of said composition is said tertiary amine.

13. The catalyst composition of claim 12 wherein said catalytic amount is at least about 0.5 part by weight of said composition per 100 parts by weight of said polyol 14. The catalyst composition of claim 12 wherein said quaternary hydroxyalkyl tertiary amine base is selected from the group consisting of N,N-dimethyl-N-hydroxyethyl-N,2-hydroxypropyl ammonium hydroxide; N,N-dimethyl-n-hydroxyethyl-N,2-phenylhydroxyethyl ammonium hydroxide; N,N-dimethyl-N-hydroxyethel-N,2-hydroxyalkyl ammonium hydroxide having the following formula:

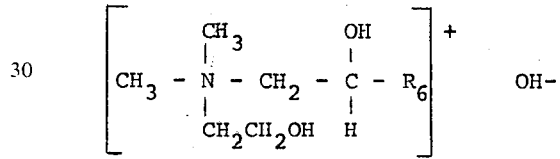

where:
$R_6$ is a $C_9$–$C_{10}$ straight chain alkyl radical; N,N-dimethyl-N-hydroxyethyl-N,2-hydroxypropyl ammonium phenoxide and mixtures thereof and wherein said tertiary amine is dimethylethanolamine.

* * * * *

PO-1050
(5/69)

UNITED STATES PATENT OFFICE
CERTIFICATE OF CORRECTION

Patent No. 3,892,687                Dated   July 1, 1975

Inventor(s)  Ibrahim Selim Bechara, Felix Patrick Carroll, Rocco Lawrence Mascioli, John R. Panchak      Page 2

It is certified that error appears in the above-identified patent and that said Letters Patent are hereby corrected as shown below:

Column 10, Table IV, under Catalyst heading for Example 9A, delete second occurrence of "hydroxyethyl-N,2-"

Column 10, Table IV, under Example heading for Example 10A, shift "ammonium hydroxide" to the Catalyst heading Column 13, line 33, "of wtaer" should read --of water--

Signed and Sealed this third Day of February 1976

[SEAL]

Attest:

RUTH C. MASON
Attesting Officer

C. MARSHALL DANN
Commissioner of Patents and Trademarks